3,487,036
ETHYLENE COPOLYMER DISPERSIONS CONTAINING DIMERIZED WOOD ROSIN SOAPS
Thomas C. Bissot, Grand Island, N.Y., assignor to E. I. du Pont de Nemours and Company, Wilmington, Del., a corporation of Delaware
No Drawing. Filed May 29, 1967, Ser. No. 642,168
Int. Cl. C08f 29/12
U.S. Cl. 260—27                                    14 Claims

ABSTRACT OF THE DISCLOSURE

Aqueous dispersions of ethylene copolymers and the method for their preparation are provided. Useful ethylene copolymers contain 30–95 weight percent polymerized ethylene and 5–70 weight percent of another polymerized monomer, such as vinyl acetate. Dispersions of these copolymers containing dimerized wood rosin soaps having greater than 50 percent by weight rosin acid dimer as emulsifying agents are exceptionally stable. Additionally, films cast from these dispersions exhibit good adhesion and water resistance.

BACKGROUND OF INVENTION

Field of invention

This invention concerns aqueous dispersions of ethylene copolymers and methods for preparing the same.

Prior art

Aqueous dispersions of ethylene copolymers are well known in the art. Heretofore, such dispersions have been most commonly prepared by emulsion polymerization techniques. However, emulsion polymerization processes for ethylene copolymers have several disadvantages. Common comonomers, such as vinyl acetate and vinyl chloride, tend to hydrolyze during emulsion polymerization. Therefore, the conditions under which these monomers can be polymerized to high molecular weight, in the presence of water, is severely limited. Also, such emulsion polymerization processes require the use of high pressures, which poses severe equipment limitations. First, the equipment must be built so as to withstand the necessary high pressures. Furthermore, the presence of water in such high pressure equipment is conducive to corrosion. Moreover, the preparation of aqueous dispersions of such ethylene copolymers by emulsion polymerization techniques greatly lowers the capacity of such equipment compared to bulk or solution polymerization.

The post-dispersion of preformed ethylene copolymers eliminates these problems. A suitable method of post-dispersing ethylene copolymers comprises dissolving the copolymer in a water-immiscible organic solvent, preferably a solvent system of a water-immiscible polymer solvent and a polar liquid, such as an alkyl alcohol, and then emulsifying the polymer solution in water. Thereafter, the solvent system is evaporated; the polymer remaining as an aqueous dispersion. While generally this method is quite useful, large amounts of emulsifying agents are ordinarily required to obtain a stable dispersion. For certain applications, large quantities of emulsifier can deleteriously affect important properties, such as water sensitivity and adhesion, in the films prepared from the dispersions.

SUMMARY OF INVENTION

According to the present invention there is provided a stable ethylene copolymer aqueous dispersion and a method for preparing the same. The aqueous dispersions of the present invention basically comprise an ethylene copolymer and, as an emulsifying agent, an alkali metal soap (Na or K) or a mixture of an alkali metal soap and an ammonium soap of dimerized wood rosin. The emulsifying agent is present in an amount of about 3–20 weight percent, based on the weight of the ethylene copolymer, with at least 2 weight percent alkali metal soap being present. Stable dispersions can be provided such that films cast from them have high water resistance and good adhesion. In general, the dispersions of the present invention are prepared by dissolving the ethylene copolymer and dimerized wood rosin in a water-immiscible organic solvent system comprising an organic hydrocarbon solvent and an alcohol and, thereafter, emulsifying the copolymer solution in a mixture of water containing an alkali metal and ammonium base. Subsequently, the organic solvent solution is evaporated from the aqueous emulsion.

DESCRIPTION OF THE INVENTION

The polymers which are useful in the present invention comprise 30–95 percent by weight copolymerized ethylene and 5–70 percent by weight of copolymerized units of at least one comonomer having polar characteristics. Among others, examples of monomers having polar characteristics are: vinyl esters of carboxylic acids, such as vinyl formate, vinyl acetate, vinyl propionate, and vinyl butyrate; unsaturated carboxylic acids, such as acrylic acid and methacrylic acid; acrylates and methacrylates, such as methyl methacrylate, ethyl acrylate and isbutyl acrylate; and halogenated vinyl compounds, such as vinyl chloride. Copolymers of ethylene and vinyl acetate are particularly suitable in this invention. Preferably, such ethylene/vinyl aceate copolymers contain 55–82 percent by weight of copolymerized ethylene and 18–45 percent by weight of copolymerized vinyl acetate. Terpolymers of ethylene containing copolymerized vinyl acetate and copolymerized acrylic acid or methacrylic acid wherein the acid content is from 0.5–10 percent by weight, and the combined vinyl acetate and acid content is from 18–40 percent by weight are also preferred copolymers. The copolymers used in this invention are generally prepared by high pressure free-radical catalysis processes, but copolymers prepared by low pressure coordination catalysis processes are also suitable. Exemplary patents illustrating copolymer preparation are Roedel, U.S. Patent 2,703,794; and Beresniewicz et al., U.S. Patent 3,215,657. The molecular weight of useful copolymers can be varied over a wide range. However, the copolymers preferably have molecular weights corresponding to a melt index of from 3–150. The copolymer melt index is determined as described in ASTM D–1238–65T using condition E for those copolymers having a melt index below about 75, and using condition A for those copolymers having a melt index in excess of 75. When condition A is used, the measured flow rate (gm./10 min.) is converted to the melt index by the following formula:

$$\text{Melt index} = \text{Log}^{-1} [0.83 \log (\text{flow rate}) + 1.825]$$

In the practice of this invention, the ethylene copolymer is dissolved in an organic solvent system. The organic solvent system selected for use in this invention must be capable of dissolving the ethylene copolymer and be immiscible with water. Furthermore, the solvent system should have a boiling point of 40° C. to 160° C., or preferably in the range of 60° C. to 100° C. If the boiling point is higher than the specified temperature, the azeotrope with water will contain a large proportion of water relative to the solvent, making it necessary to add large additional quantities of water in order to remove the solvent in the evaporation step described hereinafter. If the boiling point is too low, it is extremely difficult to effect the proper emulsification, as described below, because of resulting cavitation in the liquid phase. Preferably, the solvent system forms an azeotrope with water which contains at least about 60 percent by volume of the organic solvent system.

While the organic solvent mixture can consist solely of a hydrocarbon solvent, preferably, the solvent mixture consists of a mixture of a hydrocarbon solvent and a polar liquid, such as an aliphatic alcohol. Such solvent mixtures and methods of preparing dispersions are described in detail in U.S. Patent 3,296,172, issued Jan. 3, 1967 to Funck and Wolff. In the present invention the prefered solvent systems are benzene-isopropyl alcohol and cyclohexane-normal propyl alcohol.

In order to obtain useful particle sizes, i.e., 1–2 microns, the copolymer should be dissolved in a sufficient amount of the water-immiscible organic solvent system to form a solution having a Brookfield viscosity of about 10 to 5000 centipoises measured with a #1–#4 spindle at 60° C. and 60 r.p.m. If the viscosity exceeds about 5000 centipoises, the resulting polymer dispersion has large particles and generally poor stability. Solutions having a viscosity of less than 10 centipoises require extraordinarily large amounts of emulsifiers to obtain emulsification. It has been discovered that the preparation of solutions having viscosities within the range of from 100 to 200 centipoises at about 60° C. provide the best balance between small particle size in the resulting polymer dispersion, and solvent requirements. The actual concentration of the copolymer in the solvent depends on the molecular weight of the polymer and the nature and density of the solvent.

The dimerized wood rosin is dissolved in the polymer solvent system prior to its addition to the water phase. The addition is made in this manner since dimerized wood rosin is not commercially available in small particle size and is not water-soluble. Consequently, if the addition were made directly to the water phase, as opposed to dissolving it first in the solvent system, uniform distribution would be very difficult to achieve. The dimerized rosin soaps are usually prepared in situ by having a water-soluble base of an alkali metal (Na or K) or an ammonium base dissolved in the water phase. While sodium hydroxide or ammonium hydroxide are generally preferred, other soluble bases, such as the carbonates and bicarbonates, can also be used.

The amount of dimerized wood rosin soap necessary to emulsify the copolymer and to provide dispersion stability according to the present invention is dependent upon the molecular weight of the particular ethylene copolymer. As the molecular weight of the ethylene copolymer is increased, more emulsifying agent is ordinarily required. Consequently, copolymers having molecular weights corresponding to melt indices below about 10 generally require amounts of dimerized wood rosin soap on the order of about 7 to 20 weight percent, based on the weight of the ethylene copolymer. On the other hand, low molecular weight ethylene copolymers, such as those having molecular weights corresponding to melt indices above about 10, can ordinarily be emulsified with from about 3 to 7 weight percent emulsifying agent. However, to avoid extensive coagulation during dispersion preparation, at least about 2 weight percent, based on the ethylene copolymer, of alkali metal dimerized wood rosin soap is necessary.

Since dimerized wood rosin is added with the solvent system to the water phase and the soap is formed in situ, the amount of base (i.e., sodium hydroxide, ammonium hydroxide, etc.) in the water phase is important to ensure adequate emulsifying agent during emulsification. In general, the total amount of base should be about equal to that stoichiometrically required to neutralize the dimerized wood rosin; the dimerized wood rosin in turn being used in quantities to ensure the aforementioned amounts of soap. However, the presence of excess amounts of base does not detract from the emulsifying action of the wood rosin.

While, in order to ensure dispersion stability during evaporation, a portion of the total base present in the aqueous phase must be in the form of sodium or potassium (i.e., to ensure the aforementioned 2 percent of alkali metal wood rosin soap), it is usually preferred to also have part of it in the form of the ammonium base. In fact, where water resistance and adhesion of the eventual coating is particularly desired, the ammonium base comprises the major amount of total base. When the ammonium salt is used in preparing the dispersion, the ammonium ion is generally liberated on the subsequent solvent evaporation step. Consequently, unless additional base is added after evaporation, the dimerized rosin (as opposed to the soap) remains in the dispersion and the coating prepared therefrom. Since dimerized wood rosin (as distinguished from the soap) is frequently used in copolymer coatings to increase water resistance, adhesion, and surface tack, the use of high percentages of the ammonium salt is frequently desirable. On the other hand, where extraordinarily stable dispersions, after evaporation, are desired, the base is present in primarily the alkali metal form or additional base (e.g., an ammonia solution) is added after evaporation.

Wood rosin and dimerized wood rosin have been known and available for many years. For a comprehensive description of these materials, and how they are distinguishable from other rosins and rosin derivatives, such as gum rosin, tall oil rosin, etc., reference is made to the article titled "Rosin and Rosin Derivatives" found in "Encyclopedia of Chemical Technology," vol. 11, published by Interscience Encyclopedia, Inc., at pages 779–810.

As therein set forth, wood rosin is obtained from the aged virgin pine stump and is composed of about 90 percent resin acid and about 10 percent of nonacidic material. The resin acids are monocarboxylic acids of alkylated hydrophenanthrene nuclei having two double bonds and an empirical formula of $C_{19}H_{29}COOH$. In turn, the acids can be classified into two groups, the abietic type and the pimaric type, each of which exists and is present in wood rosin in several isomeric and mixed forms. The above-mentioned article sets forth procedures for the detailed analysis of wood rosin. Also, as therein stated, the nonacidic material in wood rosin is composed of a major amount of fatty acid esters.

The polymerization of wood rosin to form the dimerized wood rosin useful in the present invention is also discussed in the "Rosin and Rosin Derivatives" article. The rosin acid dimers can be prepared by conventional polymerization methods which basically comprise treating the rosin with a polymerization catalyst at about room temperature for an extended period of time. Suitable catalysts are strong acids, such as sulfuric and phosphoric, amphoteric metal halides, such as aluminum chloride, zinc chloride, and boron trifluoride, or an acid salt, such as sodium acid sulfate. The polymerization product usually contains dimerized and non-dimerized material. For economic reasons, dimerized wood rosins containing less than about 40 percent rosin acid dimer are not desirable. On the other hand, the most useful rosins contain greater than 50 percent, and preferably greater than 75 percent rosin acid dimer. A particularly useful dimerized wood rosin is sold by Hercules Chemical Corp. as "Dymerex" Resin. This resin comprises approximately 80 weight percent rosin acid dimer, has a softening point of 152° C. as determined by the Hercules drop method, and has an acid number of 143.

In preparing dispersions the amount of water used as the water phase can be varied over a wide range, but for practical purposes, it is desirable to use the minimum amount which will avoid phase inversion during emulsification. Generally, the minimum amount is within the range of about 22 to 40 percent by volume of the combined polymer solution and water phases. The manner in which the copolymer solution phase and water phase are initially mixed is not critical, but, as indicated before, the general procedure is to add the copolymer solution phase to the water phase prior to the start of emulsification.

The emulsification of the copolymer solution in the water phase can be accomplished by any convenient manner, using any of the commercially available machines designed for emulsification. The emulsification may be conducted in either a continuous or a batch process. When a batch operation is employed, the emulsification machine is operated for about 5 to 30 minutes, depending on the particle size desired and the efficiency of the particular emulsification machine used. The emulsification should be conducted at a temperature of at least 10° C. to 20° C. below the solvent-water azeotrope temperature for efficient operation of the emulsification machine.

After the resulting emulsion is formed, the water-immiscible solvent system is removed by evaporation. This evaporation may be accomplished in any of the well-known techniques in the art, using either vacuum, atmospheric or pressure conditions. The film type evaporator employing a stream of inert gas is suitable for this evaporation. Normally, the evaporation is conducted until all of the solvent system is removed, thus leaving copolymer particles of very small size dispersed in the water phase. The evaporation may be continued to remove excess water thereby obtaining a dispersion of any desired solids content. The process of this invention is ideally suitable to prepare aqueous dispersions having a high solids content, on the order of 50 to 65 percent by weight of copolymer.

Troublesome foaming is sometimes encountered during the evaporation step because of the presence of the emulsifying agent. However, restricting the evaporation to the surface of the liquid and avoiding boiling inside the liquid helps eliminate the foaming. The use of the aforementioned solvent system of a hydrocarbon solvent and a polar liquid also aids in controlling foaming. Foaming can also be repressed by using the familiar commercial silicone antifoaming agents, or by use of a mechanical foam breaking device.

The process of this invention can be use to codisperse other materials together with the ethylene copolymers. A large variety of nateural or synthtic oils and resins can be coemulsified in this manner, for example, boiled and raw linseed oil, coumarone-indene hydrocarbon resin, additional quantities of wood rosins or tall oil rosins, nitrocellulose, paraffin wax, halogenated paraffin waxes, and the like.

Another useful application of this invention is the partial alcoholysis of an ethylene/vinyl acetate copolymer to obtain an aqueous dispersion of an ethylene/vinyl acetate/vinyl alcohol terpolymer. This is readily accomplished by adding a precalculated amount of methanol with sodium methoxide catalyst to the copolymer solution prior to emulsification.

The ethylene copolymer dispersions of this invention have many uses in the paper, textile, paint and related arts. The principal advantages over hot melts or solutions of these polymers is their much lower application viscosity, the elimination of the fire and toxicity hazards, and the elimination of air and water pollution associated with solvent systems. In the paper industry, for example, these dispersions have use as vapor barriers, subcoats for other coatings, such as polyvinylidene chloride, heat sealable coatings, adhesives, and beater additives. In the textile industry, these dispersions are useful as sizing, thread finishing and lubrication, waterproofing and binders for nonwoven fabrics.

The following examples illustrate the invention. All parts and percentages are by weight, unless otherwise indicated.

EXAMPLE 1

Two hundred twenty five grams of an ethylene/vinyl acetate copolymer containing 28 percent copolymerized vinyl acetate and having a melt index of 6 ("Elvax"[1] 260), together with 22.5 grams of "Dymerex" resin were dissolved in a solvent mixture of 1268 grams of cyclohexane and 157 grams of n-propyl alcohol. This solvent system was then added to a water phase of 0.45 gram NaOH and 4.5 grams of 28 percent $NH_4OH$ in 740 ml. of water and emulsified. About 8 percent rosin acid dimer soap, based on the ethylene copolymer, was present. Emulsification was carried out in a Model LBP Kady Mill manufactured by the Kinetics Dispersion Corporation of Buffalo, N.Y. The mill was run for 5 minutes at 17,500 r.p.m. The emulsion was then transferred to a stirred glass vessel and the solvents and part of the water evaporated at atmospheric pressure. As is also true in the following examples, most of the solvents were removed as an azeotrope with water boiling at about 67° C. Thereafter, the temperature rises to about 100° C. and additional water is removed until the desired solids level is attained. During evaporation, 4 grams of coagulate, representing less than 2 percent yield loss, was formed. The product was cooled to 60° C. and 5 ml. of 28 percent $NH_4OH$ was added. The product contained 50 percent solids, and did not coagulate after 6 minutes in a shear stability test using a Waring Blendor domestic blender operated at 15,000 r.p.m.

In comparison, Example 1 was repeated using 22.5 grams of WW Wood Rosin in place of the "Dymerex." During the evaporation, a major portion of the polymer coagulated. The coagulated material weighed 200 grams, representing an 81 percent yield loss. The remaining dispersion weighed 186 grams and contained 23 percent solids. It coagulated after 5 minutes in the shear stability test.

In further comparison, 225 grams of the ethylene copolymer of Example 1, together with 5 percent of a tall oil rosin ("Acintol" R) with a softening point (ASTM E-28-58T) of 72° C. and an acid number of 162, were dissolved in 1235 grams of benzene and 340 grams of isopropyl alcohol. Emulsification was accomplished as in Example 1 in a water phase containing 1.4 grams NaOH in 700 ml. of water. During evaporation, as in Example 1, 120 grams of coagulated polymer, representing a 50 percent yield loss, were formed. The final product contained only 19 percent solids.

EXAMPLE 2

Example 1 is repeated except that 225 grams of an ethylene/vinyl acetate/methacrylic acid terpolymer having a melt index of 6 and contining 28 percent vinyl acetate and 1 percent methacrylic acid is used. Comparable results to that of Example 1 are obtained. Similarly, high yield losses are observed when WW Wood Rosin or tall oil rosin are employed in lieu of dimerized wood rosin.

EXAMPLE 3

Three hundred grams of an ethylene/vinyl actate copolymer containing 45 percent vinyl acetate and having a melt index of 110, together with 15 grams of "Dymerex" resin, were dissolved in a solvent mixture of 1200 grams of cyclohexane and 150 grams of n-propyl alcohol. This solvent system was then emulsified as in Example 1 in a water phase of 0.6 gram NaOH and 1.8 grams of 28 precent $NH_4OH$ in 650 ml. of water. About 4 percent rosin acid dimer soap, based on the ethylene copolymer, was present. Evaporation was accomplished as in Example 1 to 56 percent solids with less than 1 percent yield loss. The dispersion did not coagulate after 10 minutes in the shear stability test. The dispersion was then blended with a dispersion of a glycerol ester of hydro-

---

[1] Registered trademark of E. I. du Pont de Nemours & Co.

genated rosin tackifying resin (Staybelite Ester #5). This blend gave a pressure sensitive adhesive.

EXAMPLE 4

Three hundred grams of an ethylene/vinyl acetate copolymer containing 33 percent vinyl acetate and having a melt index of 25, together with 15 grams of "Dymerex" resin, were dissolved in a mixture of 1230 grams benzene and 270 grams of isopropyl alcohol. The solution was emulsified as in Example 1 in a water phase of 0.62 gram NaOH and 1.8 grams of 28 percent $NH_4OH$ in 600 ml. of water. About 4 percent rosin acid dimer soap, based on the ethylene copolymer, was present. Evaporation was accomplished as in Example 1 to 52 percent solids with less than 3 percent yield loss The dispersion did not coagulate after 10 minutes in the shear stability test. The dispersed material, when blended with dispersions of tackifying resins, gave pressure sensitive adhesives.

EXAMPLE 5

Three hundred grams of an ethylene/vinyl acetate copolymer having a vinyl acetate content of 18 percent and a melt index of 150, together with 56 grams of the glycerol ester of polymerized wood rosin and 19 grams of "Dymerex" resin, were dissolved in a solvent mixture of 1230 grams of benzene and 270 grams of isopropyl alcohol. The solution was emulsified as in Example 1 in a water phase of 0.77 gram NaOH and 2.0 grams of 28 percent $NH_4OH$ in 700 ml. of water. About 5 percent rosin acid dimer soap, based on the ethylene copolymer, was present. Evaporation to 47 percent solids was accomplished as in Example 1. Two grams of coagulated material were formed during evaporation which represents a 0.5 percent loss in yield. The dispersion did not coagulate after 10 minutes in the shear stability test.

In comparison, 300 grams of the ethylene copolymer of Example 5 and 30 grams of a pale-colored hydrogenated rosin with a Hercules drop softening point of 75° C. and an acid number of 164 were dissolved in the solvent mixture of Example 5. The solution was emulsified in a water phase of 1.75 grams NaOH in 600 ml. of water. During the evaporation step 130 grams of coagulated polymer were formed, representing a 40 percent yield loss. The remaining dispersion, containing 48 percent solids, coagulated after 5 minutes in the shear stability test.

EXAMPLE 6

Two hundred twenty five grams of an ethylene/vinyl acetate copolymer containing 28 percent copolymerized vinylacetate and having a melt index of 6, together with 152 grams of a paraffin wax of 143–150 M.P., 170 grams of the glycerol ester of polymerized wood resin, and 61 grams of a dimerized wood rosin containing 50 percent rosin acid dimer, were dissolved in a solvent mixture of 997 grams of benzene and 215 grams of isopropyl alcohol. The solution was emulsified as in the preceding examples in a water phase containing 3.17 grams NaOH and 5.0 grams of 28 percent $NH_4OH$ in 900 ml. of water. About 13.5 percent rosin acid dimer soap, based on the ethylene copolymer, was present. Evaporation was accomplished as in Example 1 to 53 percent solids with less than 2 percent yield loss. The dispersion did not coagulate after 10 minutes in the shear stability test.

On repeating Example 6 with a water phase containing 1.58 grams NaOH and 7.5 grams of 28 percent $NH_4OH$, the yield loss during evaporation was still less than 2 percent. However, the dispersion coagulated after 5 minutes in the shear stability test.

EXAMPLE 7

Two hundred twenty five grams of an ethylene/vinyl acetate copolymer containing 18 percent vinyl acetate and having a melt index of 2.0, together with 75 grams of a paraffin wax of 143–150° F. M.P. and 30 grams of "Dymerex," were dissolved in a solvent mixture of 1212 grams of cyclohexane and 150 grams of n-propyl alcohol. This solution was emulsified as in Example 1 in a water phase containing 0.6 gram NaOH and 4.5 grams of 28 percent $NH_4OH$ in 700 ml. of water. About 10.7 percent rosin acid dimer soap, based on the ethylene copolymer, was present. After evaporation to 56 percent solids and readjustment to a pH of 10 with an ammonia solution, the dispersion did not coagulate after 4 minutes in the shear stability test. The product of Example 6 showed high water resistance as a heat sealable adhesive coating on polypropylene film and on aluminum foil as determined as follows:

Coatings were made on polypropylene film and aluminum foil substrates at coating weights of 2–6 pounds per 3000 sq. ft. The coated substrates were dried at 80° C. and cut into strips. The strips were then immersed in water for three days. No evidence of the coating loosening from the substrates was observed. In comparison, similar coatings prepared from dispersions wherein the emulsifying agent was sodium oleate or sodium dodecylsulfate, loosened from the substrate after only 30 minutes of soaking.

Similar results were obtained when Example 7 was repeated except for the modifications noted in the following examples:

EXAMPLE 8

An ethylene/vinyl acetate copolymer with 28 percent vinyl acetate and having a melt index of 6 was used.

EXAMPLE 9

Thirty grams of the paraffin wax was replaced with the synthetic wax, pentaerythritol tetrastearate.

EXAMPLE 10

A natural ester wax, carnauba wax, was substituted for all of the paraffin wax.

I claim:
1. A stable aqueous dispersion having combined therein (I) and ethylene copolymer comprising about 30–95 percent by weight copolymerized ethylene and about 5–70 percent by weight of copolymerized units of at least one comonomer having polar characteristics and (II) about 3–20 weight percent, based on the ethylene copolymer, of at least one emulsifying agent selected from the sodium, potassium, and ammonium soaps of dimerized wood rosin having greater than 50 percent by weight of rosin acid dimer, with the sodium or potassium soap being present in an amount of at least 2 weight percent, based on the ethylene copolymer.

2. The dispersion of claim 1 wherein the alkali metal is sodium.

3. The dispersion of claim 1 wherein the ethylene copolymer comprises about 55–82 weight percent copolymerized ethylene and about 18–45 weight percent copolymerized vinyl acetate.

4. The dispersion of claim 3 wherein the alkali metal is sodium and the dimerized wood rosin has greater than 75 percent by weight of rosin acid dimer.

5. In the process of preparing an aqueous dispersion of an ethylene copolymer of about 30–95 percent by weight copolymerized ethylene and about 5–70 percent by weight of copolymerized units of at least one comonomer having polar characteristics, comprising (I) dissolving the copolymer in a water-immiscible organic solvent system, (II) emulsifying the solvent system containing the dissolved polymer in a water phase and thereafter (III) evaporating off the organic solvent; the improvement comprising emulsifying the solvent system containing the dissolved polymer in the presence of about 3–20 weight percent, based on the ethylene copolymer, of at least one emulsifying agent selected from the sodium, potassium, and ammonium soaps of dimerized wood rosin salt having greater than 50 percent by weight rosin acid dimer, with the sodium or potassium soap being present in an amount of at least 2 weight percent, based on the ethylene copolymer.

6. The process of claim 5 wherein the ethylene copolymer comprises about 55–82 weight percent copolymerized ethylene and about 18–45 weight percent copolymerized vinyl acetate.

7. The process of claim 6 wherein the alkali metal is sodium and the dimerized wood rosin has greater than 75 percent by weight rosin acid dimer.

8. The process of claim 5 wherein dimerized wood rosin is dissolved in the water-immiscible organic solvent system prior to its emulsification in the water phase and the water phase contains sodium, potassium or ammonium base.

9. The process of claim 8 wherein the ethylene copolymer comprises about 55–82 weight percent copolymerized ethylene and about 18–45 weight percent copolymerized vinyl acetate.

10. The process of claim 9 wherein the water-immiscible organic solvent system comprises an organic hydrocarbon solvent of benzene or cyclohexane and a polar liquid of n-propanol or isopropanol.

11. The dispersion of claim 1 additionally containing at least one wax.

12. The dispersion of claim 11 wherein the wax is a paraffin wax.

13. The process of claim 5 wherein at least one wax is additionally dissolved in the organic solvent system.

14. The process of claim 13 wherein the wax is a paraffin wax.

References Cited

UNITED STATES PATENTS

| | | | |
|---|---|---|---|
| 2,490,550 | 12/1949 | Sermattci | 260—27 |
| 2,676,121 | 4/1954 | Chapman | 260—27 |
| 2,703,794 | 3/1955 | Roedel | 260—27 |
| 3,232,895 | 2/1966 | Klein et al. | 260—27 |
| 3,037,871 | 6/1962 | Floyd et al. | 260—97 |

FOREIGN PATENTS 950,406    2/1964    Great Britain.

DONALD E. CZAJA, Primary Examiner
W. E. PARKER, Assistant Examiner

U.S. Cl. X.R.

260—28.5, 29.6